Nov. 20, 1962  G. F. WIEGER  3,064,767
BRAKE ACTUATOR

Filed Nov. 13, 1959  3 Sheets-Sheet 1

INVENTOR.
GEORGE F. WIEGER
BY John A. Young
ATTORNEY

Nov. 20, 1962  G. F. WIEGER  3,064,767
BRAKE ACTUATOR

Filed Nov. 13, 1959  3 Sheets-Sheet 3

INVENTOR.
GEORGE F. WIEGER
BY John A. Young
ATTORNEY

United States Patent Office 3,064,767
Patented Nov. 20, 1962

3,064,767
BRAKE ACTUATOR
George F. Wieger, South Bend, Ind., assignor to The Bendix Corporation, a corporation of Delaware
Filed Nov. 13, 1959, Ser. No. 852,830
5 Claims. (Cl. 188—78)

This invention relates to a brake actuator and more specifically to a mechanical actuating means for effecting radially outward applying movement of brake shoes which are engaged with a relatively rotatable drum.

Almost all of the currently produced internally expanding shoe type brakes are equipped with two distinct actuating means to provide a factor of safety in that one actuating means is always available in the event of inoperativeness of the other. The present application refers specifically to the mechanical actuating system of the brake and is functional not only for emergency braking, but also for parking braking. The lever member in the mechanically actuating system has been a particularly difficult item to manufacture and to assemble, it being understood that brakes in order to be economical must be producible in the order of millions per year. There is shown in copending application 546,553 filed November 14, 1955, a design of brake lever which is a substantial improvement over preceding structures. While the parking brake lever shown in application No. 546,553 is advantageous over the prior art in that it is both easier to manufacture and to assemble, there are additional factors which make it unsuitable for cetain applications. Within the brake cavity the support plate or backing plate for the shoes is variously formed so as to provide inlets for the actuating cable. It sometimes happens, particularly with smaller size brakes, that the applied end of the lever tends to become caught on raised portions of the backing plate and the parking brake lever is then hung up and cannot be actuated.

Figure 6:
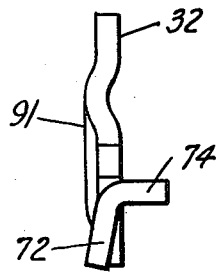

Another important consideration to be taken into account in the structure of the parking brake lever is its manufacturability. Wherever metal parts are formed by bending operations, there is apt to be considerable breakage or at least weakening of the parts. As shown in FIGURE 6 of application No. 546,553 the operated end of the lever is bent reversely through 180° to form a catch for the cable end. Such operation has caused considerable difficulties in fracturing of the lever end. In the later improvement shown in FIGURE 4 of the patent application 546,553 an improvement was effective by performing two spaced 90° bends in the lever and which reduce the incidence of breakage but still involves a difficult forming operation.

It is therefore an object of the present invention to provide a parking brake lever having an operative connection with a cable end which will operate freely within the brake cavity without interference from portions of the backing plate or the brake shoe. Owing to the improving design, the braking lever may therefore be operated through a wider range of angular movement to effect operation of the brakes, even the smaller diameter ones which present special interference problems.

Another object of the invention is to provide an improved process of manufacture of the parking brake lever which is simpler and therefore more economical and will provide a reliable locking connection with the cable end which operates the brake.

Another object of the invention is to provide a parking brake structure which lends itself to a rapid method of assembly of the actuating system.

Other objects and features of the present invention will become apparent from the following description, which proceeds with reference to the accompanying drawings, wherein an example embodiment of the invention has been chosen for purposes of illustration.

Figure 1:
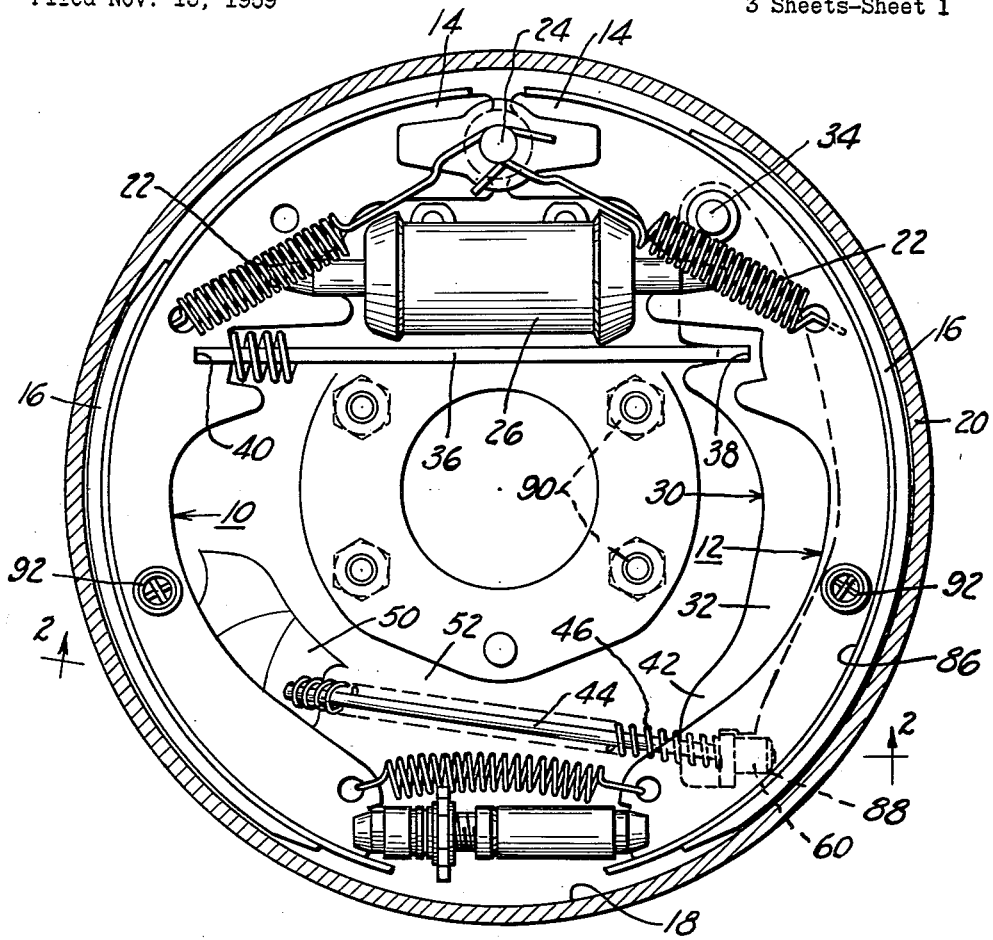
Figure 2:
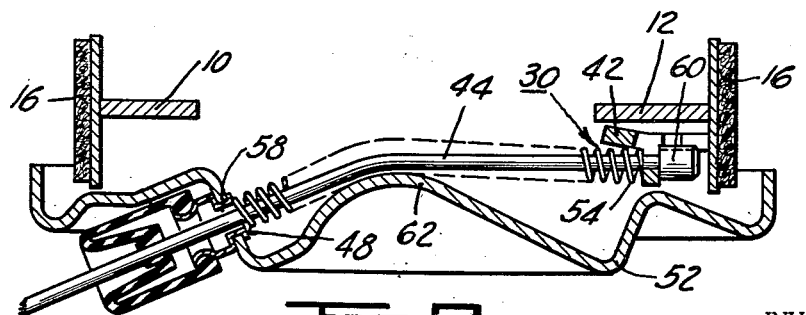
Figure 4:
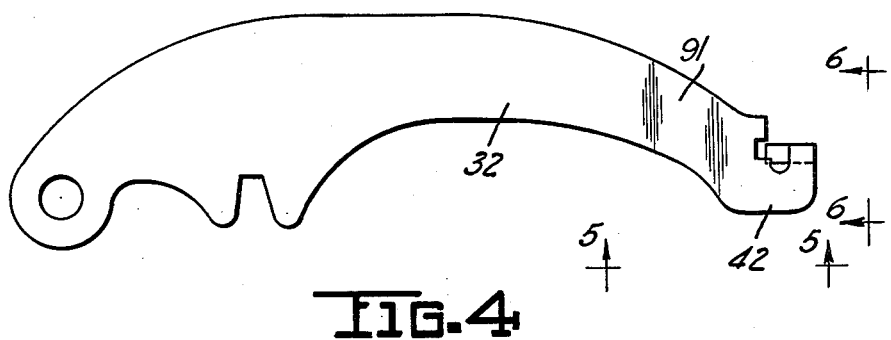
Figure 3:
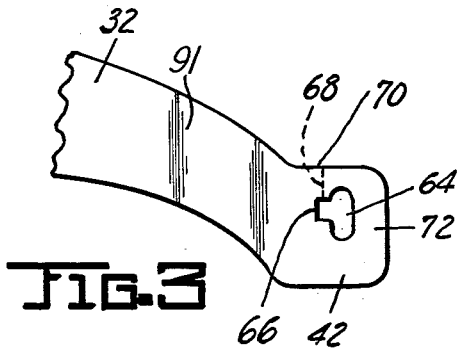
Figure 5:
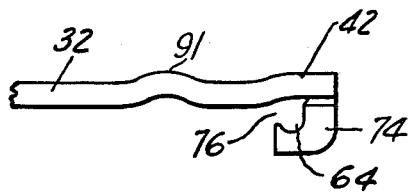
Figure 7:
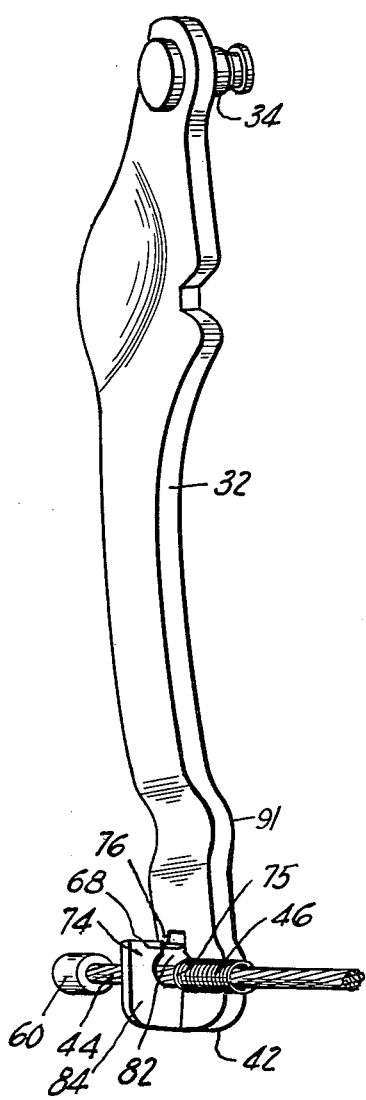
Figure 8:
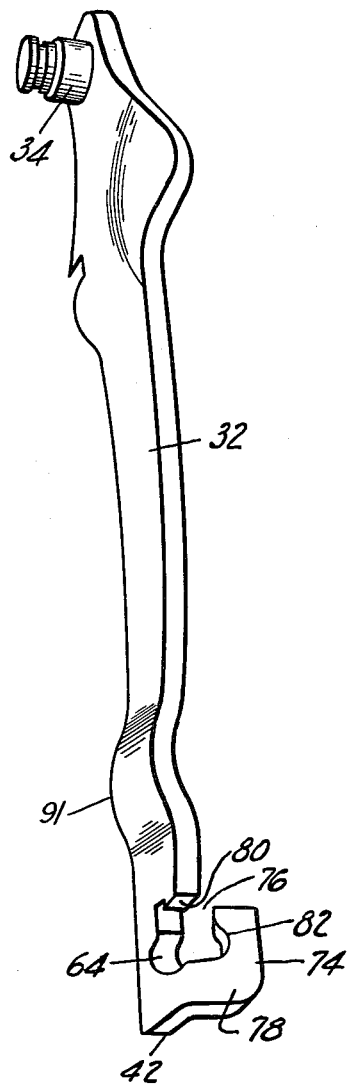

In the drawings:
FIGURE 1 is a side elevation of a brake having a mechanical actuator constructed in accordance with the present invention;
FIGURE 2 is a section view taken on line 2—2 of FIGURE 1;
FIGURE 3 is an enlarged fragmentary view of the end of the actuator lever which is shown as a partially processed blank before the forming operations are completed;
FIGURE 4 is a detail view of the lever shown detached from the brake and as it appears when completely formed;
FIGURE 5 is a fragmentary side view of the lever shown in FIGURE 4 and looking in the direction of the arrows 5—5;
FIGURE 6 is an end view of the lever looking in the direction of the arrows 6—6 in FIGURE 4;
FIGURE 7 is an isometric exploded view of the lever and cable attachment; and
FIGURE 8 is an isometric view from a slightly different angle from FIGURE 7 and showing the cable detached from the lever.

Referring now to the drawings, the two brake shoes 10 and 12 have adjacent ends 14 which are spread apart to effect engagement of their friction material lining 16 with an opposed cylindrical surface 18 of drum 20. Return springs 22 are fastened between anchor 24 and shoe ends 14 to hold the brake shoes in a normally retracted position.

There are two means for applying the brakes, the one being a conventional hydraulically operated wheel cylinder 26, and the other being mechanically operated acuating system designated generally by reference numeral 30. The mechanically operated actuating system 30 comprises a lever 32 having a pinned connection 34 with brake shoe 12 which provides pivotal movement of the lever thereon, and a strut 36 which is received within a notch 38 of the lever 32 and a similar notch 40 of the brake shoe 10.

The end 42 of the lever 32 is especially adapted for its connection with and operation by cable 44 which is passed through a spring 46 bearing at one end 48 against a raised portion 50 in support plate 52 and at the other spring end 54 against lever end 42. Cable 44 is passed through an opening 58 in raised portion 50 and passes through the spring 46, there being a boss 60 at the cable end which is fastened to the lever end 42 in order that the cable can effect turning movement of the lever by a suitable operating mechanism such as a foot pedal or hand operated lever, etc. (not shown). In order that the cable pulling action is at nearly right angles to the mounting of the lever, the cable and spring are passed over an elevation 62 (FIGURE 2) formed integrally in the support plate 52. In order that the support plate can be provided at both the right and left rear wheel brakes, there are two raised portion 50, each of which can be provided with an opening to permit installation of the mechanically operated actuating system at either of the rear wheels. These raised portions, however, especially in the case of small diameter brakes, are prone to create an interference with the actuated end 42 of the lever which is connected to the cable 44. The present invention, in addition to being simpler to manufacture, is intended to obviate this difficulty.

Referring now to FIGURES 3, 4, 5, and 6, the parking brake lever is formed initially as a blank which is stamped from a sheet metal stock and the end 42 (FIGURE 3) is formed with a keyhole shaped opening 64 having an oval shaped portion with a slight indentation 66 and a slit 68 is then formed between the indentation 66 and the edge 70 which is adjacent the rim of the shoe 12. The margin 72 is then bent at right angles to provide a flange 74 (FIGURE 6) which is disposed subsantially at right angles to the line of tensile force developed by the cable 44. A portion of flange 74 bounded by the slot 64 and slit 68 is in the form of a hook which opens toward the undersurface of the lever but terminates short of the undersurface to provide a gap 76 (FIGURE 5). In assembling the cable 44 and the lever 32 the end 75 of spring 46 is pulled back (FIGURE 7) and the cable end is slipped through the gap 76 so that the boss 60 will seat against face 78 of the flange 74 and will further bear against edge 80 provided by the slit 68. It will be noted that the boss 60 (FIGURE 2) is located well above the support plate 52 and is at least partially located within the plane of the lever 32. The cable is now located within the notch 82 of the flange 78 which is formed as a hook and when the end 75 of spring 46 is released, it will come into seating engagement with side 84 (FIGURE 7) of the flange 78 to hold the boss 60 tightly against its face 78 to rotate the lever 32 on its pin connection 34 until it engages the underside of the rim 86 of shoe 12 (FIGURE 1).

The spring end 75 is of such diameter that it extends over the open end of the hook 82 to close the gap 76 and thereby confine the portion of the cable between the boss 60 and spring end 75 within notch 82. In this way it is virtually impossible to disconnect the cable 44 from the lever 30 by accident; yet, it is a simple matter to effect disconnection manually by first drawing back the spring end 75 and slipping the cable sidewise.

In operation, in the event that the hydraulic wheel cylinder is inoperative and an emergency brake application is required, or during parking braking, the cable 44 is tensioned by the operator so that the lever 32 is caused to swing about its pinned connection 34 against the resistance of spring 46. The lever fulcrums at its pinned connection 34 to exert applying force on shoe 10 through strut 36, and also fulcrums on its connection with strut 36 to apply shoe 12 through the pinned connection 34. The lever is free to swing through a wide angular range starting from its point of engagement 88 (FIGURE 1) with the undersurface of rim 86 past raised portion 50 (FIGURE 2) and elevation 62 until the forward edge of the lever contacts the mounting bolts 90. This extent of angular movement is sufficient to apply the brake shoes even when they are in a worn condition and there is no problem of hanging the lever up on any obstructions on the backing plate. Because the lever end 42 can swing freely past any of the convolutions of the backing plate the lever is free to move closer to the brake shoe 12 and does in fact contact the brake shoe to define the brake lever retracted position. When the applying effort on cable 34 is relieved, the spring 46 bearing against the lever end 56 will swing it back to its original position and thereby allow the return springs 22 to disengage the shoes from engagement with surface 18 of the drum 20. In previous parking brake lever constructions the lever contacted the holddown 92 and the brake lever could not be moved closer to the shoe owing to interference with the backing plate. The lever 32 also has a waved section 91 which reinforces the lever against bending in the vicinity of the mounting 34. The lever is guided laterally by sliding engagement with the undersurface of the web, the spring 46 tending to push the lever 30 upwardly against the shoe web.

It is a relatively simple matter to attach and detach the cable from the shoe end by the method described, necessitating simply compressing the spring 46 along its length to provide a portion of cable just rearwardly of the boss 60, this portion being slipped past the gap 76 and located within notch 82, the spring end 54 being then released to become seated on face 84 of the flange and clamping boss 60 against face 78. Because the boss 60 is loaded by the spring against 78 and edge 80 it is not susceptible to accidental dislocation, and the cable is confined against accidental dislocation from within the notch 82 by reason of the end coil of the spring which prevents its movement through the gap 76.

It was previously the practice to limit the retractive movement of the lever by its engagement with a holddown device 92 of the brake shoe, but this is objectionable because of possible deformation of the holddown member particularly when this is in the form of a spring.

Although the present invention has been in connection with only two selected embodiments of the invention, it will be understood that these are only illustrative and in no sense restrictive of the invention. It is to be reasonably expected that those skilled in the art can make various modifications and revisions of the invention as suit design requirements and it is intended that such revisions and variations as incorporate the herein disclosed principles will be included within the scope of the following claims as equivalents of the invention.

What is claimed is:

1. In a brake having a backing plate, and a pair of arcuate brake shoes with adjacent spreadable ends, a brake actuating lever including means for mounting one end of said lever on one of said shoes, the other end of said lever being free, a strut interconnecting said lever and the other of said shoes, a depending flange integral with and located at the free end of said lever and so constructed that its opposite faces are substantially perpendicular to the line of force effecting turning of said lever, a cable extending through an opening in said backing plate and including a boss at one cable end bearing against one face of said flange facing oppositely the direction of operating movement of said lever and engaging a portion of the free end of said lever to be in locked relation therewith, a hook shaped notch in said flange providing a gap between the lever undersurface and flange and proportioned to receive the cable by sidewise slipping movement within said notch, a spring surrounding said cable and having one end coil engaging said backing plate, the other end coil of said spring being in abutting relation against the side of said flange facing direction of operating movement of said lever to hold said boss against the opposite side of said flange with said one end coil of said spring overlying the gap through which said cable is slipped to lock the cable within said notch, said boss being disposed to engage a portion of one of said brake shoes to define the retracted position of said lever.

2. In a brake including two arcuate brake shoes having ends adapted for movement apart to effect brake application, a mechanical actuator for said brake shoes comprising a lever having one end pivotally connected with one of said brake shoes, a strut located between the other of said brake shoes and a portion of said lever, a flange at the operated end of said lever opposite its pivotal mounting with said one shoe and having a portion integral with both said flange and lever providing a right angle bend disposing said flange in a plane substantially perpendicular to the line of force actuating said lever, a notch in said flange forming a hook which opens at the undersurface of said lever and proportioned to provide a limited access gap therebetween, a cable for mechanically turning said lever and further including a boss at the end of said cable, said cable being proportioned to slip past the gap formed between said flange and lever undersurface to be located within said hook, a spring surrounding said cable and having an end coil engaging a stationary portion of said brake, the other end coil of said spring engaging one side of said flange and being of a size to close said hook and thereby confine the portion of said cable received therein, said boss and spring end being held at opposite sides of said flange by said spring.

3. In a brake, a mechanical actuator comprising a lever, means for mounting said lever for pivotal movement about one end thereof, a cable having a boss at the end thereof and a spring through which said cable is passed to provide a retracting force on said lever serving to swing the lever on its mounting in one direction of movement, a flange constructed perpendicularly to the applied end of said lever and having a connecting portion integral with both said flange and lever, said flange being disposed perpendicularly to the line of force exerted by said cable effecting turning movement of said lever, a notch in said flange forming a hook which opens in a direction of the plane of movement of said lever and proportioned to provide a gap between the open hook end and lever for slipping said cable across said hook, said boss being in seated position against one flange side and the end of said coil spring being in seated relation against the opposite side of said flange, the end coils of said spring being proportioned to extend past the open end of said hook to retain the cable portion therein intermediate said boss and spring end.

4. In combination with a pair of brake shoes, a mechanical actuator for said shoes comprising a lever, means for mounting said lever for angular movement about one end thereof, a flange formed from a portion at the end of said lever oppositely from its mounted end and disposed perpendicularly thereto in a plane perpendicular to the line of force effecting turning movement of said lever, a notch constructed in said flange to provide a hook opening toward the plane of said lever and having a clearance at its open end which defines a gap therebetween, a cable proportioned to slip through said gap to be disposed within said hook and including a boss at its one end which is brought into seating engagement at one side of said flange to effect a connection between said cable and said lever, a spring surrounding said cable and bearing at its one end against said flange with the end coil extending past the open end of said hook to confine the cable portion within said notch.

5. In combination with a pair of brake shoes, a mechanical actuator for said shoes comprising a lever, means for mounting said lever for angular movement about one end thereof, a flange integral with the end of said lever oppositely from its mounted end and disposed perpendicularly thereto in a plane perpendicular to the line of force effecting turning movement of said lever, a notch constructed in said flange to provide a hook with its open end extending toward the plane of said lever and having a clearance therefrom defining a gap therebetween, a cable proportioned to slip through said gap to be disposed within said hook and including a boss at its one end which is brought into seating engagement at one side of said flange to effect a connection between said cable and said lever, said boss further engaging a portion of the end of the lever with which said flange is integral, a spring surrounding said cable and bearing at its one end against said flange with the end coil extending past the open end of said hook to confine the cable portion within said notch.

References Cited in the file of this patent
UNITED STATES PATENTS

| | | |
|---|---|---|
| 2,094,391 | White | Sept. 28, 1937 |
| 2,404,054 | Goepfrich | July 16, 1946 |
| 2,497,283 | Wharam et al. | Feb. 14, 1950 |
| 2,652,620 | Sutowski | Sept. 22, 1953 |
| 2,666,504 | Berno et al. | Jan. 19, 1954 |
| 2,855,667 | Meyer | Oct. 14, 1958 |
| 2,912,068 | House | Nov. 10, 1959 |
| 2,924,116 | Abbott | Feb. 9, 1960 |

UNITED STATES PATENT OFFICE
CERTIFICATE OF CORRECTION

Patent No. 3,064,767 November 20, 1962

George F. Wieger

It is hereby certified that error appears in the above numbered patent requiring correction and that the said Letters Patent should read as corrected below.

Column 1, line 30, for "cetain" read -- certain --; line 49, for "and" read -- end --; lines 50 and 51, for "difficuit" read -- difficult --; column 3, line 1, for "subsantially" read -- substantially --.

Signed and sealed this 23rd day of July 1963.

(SEAL)
Attest:

ERNEST W. SWIDER
Attesting Officer

DAVID L. LADD
Commissioner of Patents